US000001100H

United States Statutory Invention Registration [19]

[11] Reg. Number: H1100

Blue

[43] Published: Sep. 1, 1992

[54] YARN BOBBIN

[76] Inventor: Mark D. Blue, 305 Brook Hollow Dr., Columbia, S.C. 29223

[21] Appl. No.: 729,374

[22] Filed: Jul. 12, 1991

[51] Int. Cl.[5] ..... B65H 75/10

[52] U.S. Cl. ..... 242/118.3; 242/118.32

[58] Field of Search ..... 242/118.3, 118.32

[56] References Cited

U.S. PATENT DOCUMENTS

| | | | |
|---|---|---|---|
| 1,834,032 | 12/1931 | Malcolm | 242/118.3 |
| 2,569,094 | 9/1951 | Dunlap | 242/118.32 |
| 3,138,345 | 6/1964 | Luber | 242/118.3 X |
| 3,158,335 | 11/1964 | Deussen | 242/118.3 X |
| 4,055,311 | 10/1977 | Bock et al. | 242/118.3 X |
| 4,063,688 | 12/1977 | Grellier | 242/118.3 X |
| 4,742,972 | 5/1988 | Rost et al. | 242/118.32 X |

*Primary Examiner*—Bernarr E. Gregory

[57] ABSTRACT

A yarn package support tube for traverse wound packages has tapered recesses adjacent each end of the tube extending around the circumference of the tube. The recesses taper toward the center of the tube to provide a tapered surface at the yarn winding reversals.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

YARN BOBBIN

This invention relates to winding of yarn packages and, more particularly, relates to the supports on which textile yarn packages are wound.

In the process of helically winding yarn (particularly polyester and polyamide yarns) onto cylindrical yarn supports, it has been found that there is a tendency for the initial windings of yarn next to the bobbin, near the yarn reversals, to slough toward the center of the bobbin. This sloughing causes entanglement between adjacent layers of yarn which results in breakage of the yarn at the entanglement when it is unwound from the bobbin for further processing.

SUMMARY OF THE INVENTION

A cylindrical yarn support has tapered recesses extending around its circumference located adjacent each of its ends. Each recess is tapered toward the center of the support to provide a tapered surface at the yarn winding reversals. This tapered recess increases the normal component of yarn tension resulting in higher frictional force at the reversals to reduce yarn sloughing or slippage toward the center of the support.

DETAILED DESCRIPTION OF THE PREFERRED EMBODIMENT

Figure 1:
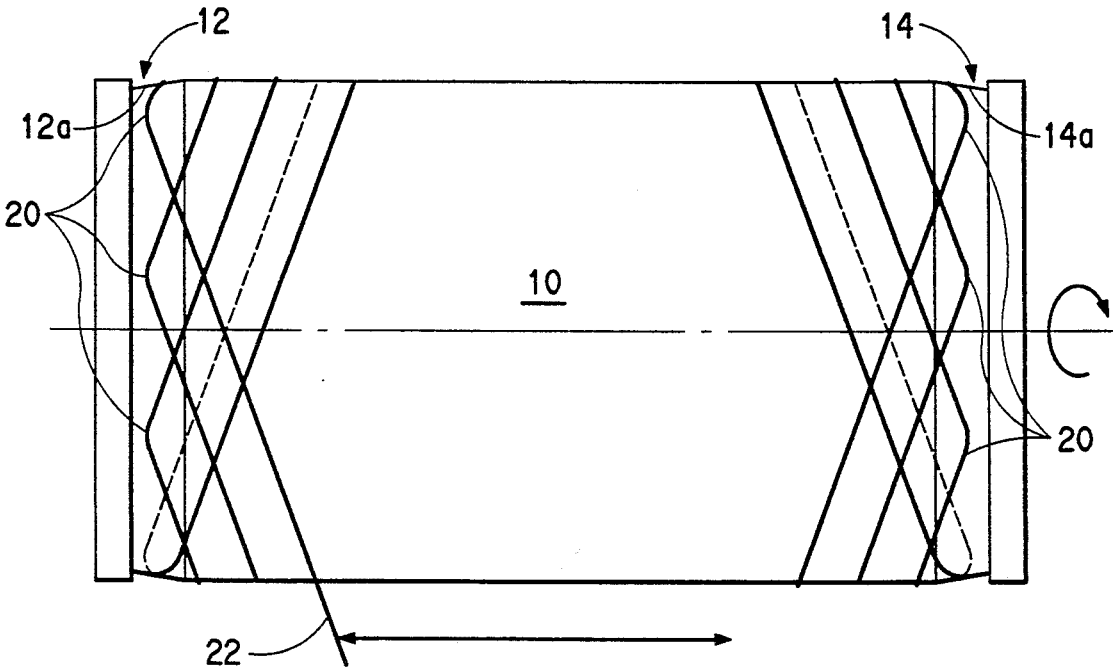
FIG. 1 is an elevation view of a yarn support with the initial winding shown on the surface of the support.

Referring to FIG. 1, the preferred yarn support is a hollow cylindrical tube 10 having a pair of tapered recesses 12, 14 formed into its outer surface near and in substantial parallelism with each end of the tube 10. Each recess is tapered toward the center of the tube 10 to provide tapered surfaces 12*a* and 14*a* at the locations where the yarn reversals 20 occur during the traverse winding of yarn 22 on rotating support 10. The recesses 12, 14 are typically 0.010 inch deep by $\frac{5}{8}$ inch wide, and the yarn tube is formed of paper.

Yarn may be wound on support 10 on readily available winding equipment. For example, the yarn 22 is carried by a suitable guide that traverses the rotating support as indicated by the direction arrows.

Figure 2:
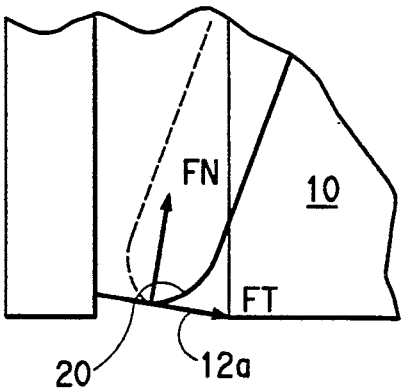
FIG. 2 is an enlarged view of one end of the support showing a diagram of the relative magnitude of the force components resulting from yarn tension at the reversals during winding.
Figure 3:
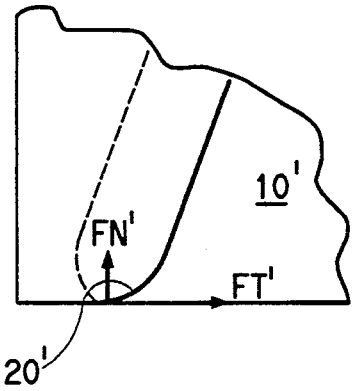
FIG.3 (PRIOR ART)
FIG. 3 is an enlarged view of one end of a prior art support showing a diagram of the relative magnitude of force components resulting from yarn tension at the reversals during winding.

In operation the tapered surfaces 12*a* and 14*a* provide a tapered surface or ramp at the location of the winding reversals 20 on the package support. As shown in FIG. 2, when the yarn is laid down in a reversal curve on this ramp, the normal component of the yarn tension (FN) results in high frictional force which overcomes transverse component (FT) of yarn tension to cause the yarn to remain in place. When compared to a similar reversal 20' on a straight cylindrical prior art support 10' (FIG. 3), the transverse component of yarn tension FT' exceeds the normal component of yarn tension FN' causing the yarn to tend to slip or slough to the center of the support 10'.

What is claimed is:

1. A yarn support tube for traverse wound yarn packages, said tube having tapered recesses extending around its circumference adjacent each of its ends, each recess being tapered toward the center of the support tube to provide a tapered surface at yarn winding reversals on the support tube, whereby as yarn is laid down in a reversal curve on said tapered surface, the normal component of yarn tension is greater than the transverse component of yarn tension causing the yarn to remain in place.

2. The yarn support tube of claim 1 wherein said tube is formed of paper.

3. The yarn support tube of claim 1 or 2 wherein said tapered recess is about 0.010 inch deep and about $\frac{5}{8}$ inch wide.

* * * * *